United States Patent
Beacham et al.

(10) Patent No.: US 10,579,785 B2
(45) Date of Patent: Mar. 3, 2020

(54) AUTOMATIC AUTHENTIFICATION FOR MES SYSTEM USING FACIAL RECOGNITION

(71) Applicant: General Electric Company, Schenectady, NY (US)

(72) Inventors: Jimmie Beacham, Waukesha, WI (US); Tao Jia, Waukesha, WI (US); Jilin Tu, Schenectady, NY (US); Peter Tu, Niskayuna, NY (US); Zhiguang Wang, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/721,114

(22) Filed: Sep. 29, 2017

(65) Prior Publication Data
US 2019/0102528 A1 Apr. 4, 2019

(51) Int. Cl.
*G06F 21/32* (2013.01)
*H04L 9/32* (2006.01)
*G06K 9/00* (2006.01)

(52) U.S. Cl.
CPC ......... *G06F 21/32* (2013.01); *G06K 9/00255* (2013.01); *G06K 9/00288* (2013.01); *H04L 9/3231* (2013.01)

(58) Field of Classification Search
CPC ... G06F 21/32; H04L 9/3231; G06K 9/00288; G06K 9/00255
See application file for complete search history.

(56) References Cited

U.S. PATENT DOCUMENTS

| | | | | |
|---|---|---|---|---|
| 6,128,398 A | * | 10/2000 | Kuperstein | G06K 9/00288 382/116 |
| 8,027,521 B1 | * | 9/2011 | Moon | G06K 9/00288 382/118 |
| 2011/0299764 A1 | * | 12/2011 | Snoek | G06F 16/5838 382/159 |

(Continued)

OTHER PUBLICATIONS

Ernest, Guy. "Combining Deep Learning Networks (GAN and Siamese) to Generate High Quality, Life-Like Images" Published Sep. 11, 2017 (7 pages) https://aws.amazon.com/blogs/machine-learning/combining-deep-learning-networks-gan-and-siamese-to-generate-high-quality-life-like-images/.*

(Continued)

*Primary Examiner* — Joseph P Hirl
*Assistant Examiner* — Thomas A Gyorfi
(74) *Attorney, Agent, or Firm* — Philip S. Hof; The Small Patent Law Group, LLC (57) ABSTRACT

An authentication system includes a processor, a non-transitory computer readable medium, and one or more programs stored on the computer readable medium, where the processor, under control of the programs implements at least one neural network trained to produce first feature vectors from facial features extracted from a population of first facial images and, after training, configured to produce a second feature vector from facial features extracted from a second facial image, a discriminative classifier trained to identify closely matching ones of the first feature vectors and configured to identify whether at least one first feature vector and the second feature vector meet a correlation threshold. The authentication system may also include an access interface configured to allow access if the correlation threshold is met.

20 Claims, 5 Drawing Sheets

(56) References Cited

U.S. PATENT DOCUMENTS

| | | | |
|---|---|---|---|
| 2015/0125049 A1* | 5/2015 | Taigman | G06K 9/00268 |
| | | | 382/118 |
| 2015/0178554 A1* | 6/2015 | Kanaujia | G06T 19/20 |
| | | | 382/118 |
| 2015/0347734 A1* | 12/2015 | Beigi | G06F 21/32 |
| | | | 713/155 |
| 2016/0379041 A1* | 12/2016 | Rhee | G06K 9/00208 |
| | | | 382/118 |
| 2017/0262695 A1* | 9/2017 | Ahmed | G06K 9/00288 |
| 2017/0351909 A1* | 12/2017 | Kaehler | G06K 9/00288 |
| 2018/0075581 A1* | 3/2018 | Shi | G06T 3/4053 |

OTHER PUBLICATIONS

Mehrotra, Akshay et al. "Generative Adversarial Residual Pairwise Networks for One Shot Learning" Published Mar. 23, 2017 (8 pages) https://arxiv.org/pdf/1703.08033.pdf.*

* cited by examiner

AUTOMATIC AUTHENTIFICATION FOR MES SYSTEM USING FACIAL RECOGNITION

TECHNICAL SUMMARY

The disclosed exemplary embodiments relate generally to facial recognition, and more particularly to using facial recognition for user authentication and systems access.

BACKGROUND

Certain facilities such as clean room manufacturing operations may require strict access control. Typical access control systems generally require logging in using a keyboard entry, a card or badge swipe, fingerprint recognition, or other methods. However, multiple keyboard entries may require a significant amount of time and may represent a security risk, a card or badge swipe might not be acceptable in certain clean environments, and fingerprint recognition may not be acceptable when gloves are required.

Facial recognition may be employed for access control but present systems typically use a predefined database that does not account for changes in facial features, hair styles, wearables such as glasses, or the use of safety equipment, such as face shields or hoods. It would be advantageous to supply a system that provides automatic controlled access using facial recognition that accounts for user changes and for items that may be present near or on a user's face.

SUMMARY

The disclosed embodiments are directed to an authentication system including a data collection station for collecting data for use in authentication, an access control station for authorizing access, and a database management system for generating and storing information used for authentication. The authentication system utilizes one or more neural networks to provide automated access using facial recognition that accounts for changes in external elements, such as safety equipment worn by a user and changes in appearance.

In at least one aspect, the disclosed embodiments are directed to an authentication system including a processor, a non-transitory computer readable medium, and one or more programs stored on the computer readable medium, wherein the processor, under control of the programs implements at least one neural network trained to produce first feature vectors from facial features extracted from a population of first facial images and, after training, configured to produce a second feature vector from facial features extracted from a second facial image, a discriminative classifier trained to identify closely matching ones of the first feature vectors and configured to identify whether at least one first feature vector and the second feature vector meet a correlation threshold. The authentication system may also include an access interface configured to allow access if the correlation threshold is met.

The at least one neural network may include a generative adversarial network.

The at least one neural network may include a combination of at least one generative adversarial network and a Siamese neural network.

The discriminative classifier may include a neural network.

The at least one neural network may be configured to augment one or more of the first feature vectors to yield additional first feature vectors with first variables representing elements separate from facial characteristics identifying a user.

The at least one neural network may be configured to utilize the augmented first feature vectors to identify user worn equipment required for access.

The at least one neural network may be configured to identify second variables in one or more of the first feature vectors representing elements separate from facial characteristics identifying a user, and generate additional first feature vectors without the identified variables.

The authentication system may include a data collection station with a camera for acquiring one or more of the first facial images of the population of first facial images, a face detector for detecting a face in the one or more first facial images, and a feature extractor for producing the facial features extracted from the one or more first facial images.

The authentication system may also include an access control station with a camera for acquiring the second facial image, a face detector for detecting a face in the second facial image, a feature extractor for producing the facial features extracted from the second facial image, and a user interface for inputting additional credentials if the correlation threshold is not met.

The authentication system may include a credentials database with information for identifying a valid user for comparison to the additional credentials.

In at least one other aspect, the disclosed embodiments are directed to an authentication method including training at least one neural network to produce first feature vectors from facial features extracted from a population of first facial images, training a discriminative classifier to identify closely matching ones of the first feature vectors, using the at least one neural network to produce a second feature vector from facial features extracted from a second facial image, using the discriminative classifier to identify whether at least one first feature vector and the second feature vector meet a correlation threshold, and allowing a user, from whom the second facial image was acquired, access if the correlation threshold is met.

The at least one neural network may include a generative adversarial network.

The at least one neural network may include a combination of at least one generative adversarial network and a Siamese neural network.

The discriminative classifier may include a second neural network.

The authentication method may also include augmenting one or more of the first feature vectors to yield additional first feature vectors with first variables representing elements separate from facial characteristics identifying a user.

The authentication method may include utilizing the augmented first feature vectors to identify user worn equipment required for access.

The authentication method may further include identifying second variables in one or more of the first feature vectors representing elements separate from facial characteristics identifying a user, and generating additional first feature vectors without the identified variables.

The authentication method may include acquiring one or more of the first facial images of the population of first facial images using a camera, detecting a face in the one or more first facial images, and using a feature extractor to produce the facial features extracted from the one or more first facial images.

The authentication method may further include acquiring the second facial image using a camera, detecting a face in the second facial image, using a feature extractor to produce the facial features extracted from the second facial image, inputting additional credentials if the correlation threshold is not met, and allowing access if the additional credentials are valid.

In another aspect, the disclosed embodiments are directed to an authentication system having a database management system including a processor, a non-transitory computer readable medium, and one or more programs stored on the computer readable medium, where the processor, under control of the programs implements at least one neural network trained to produce first feature vectors from facial features extracted from a population of first facial images and configured to produce a second feature vector from facial features extracted from a second facial image, a discriminative classifier trained to identify closely matching ones of the first feature vectors and configured to identify whether at least one first feature vector and the second feature vector meet a correlation threshold, a data collection station including a camera for acquiring one or more of the first facial images of the population of first facial images, a face detector for detecting a face in the one or more first facial images, and a feature extractor for producing the facial features extracted from the one or more first facial images.

The system also includes an access control station including a camera for acquiring the second facial image, a face detector for detecting a face in the second facial image, a feature extractor for producing the facial features extracted from the second facial image, and an access interface, controlled by the access control station for providing access to equipment.

DETAILED DESCRIPTION

Figure 1:
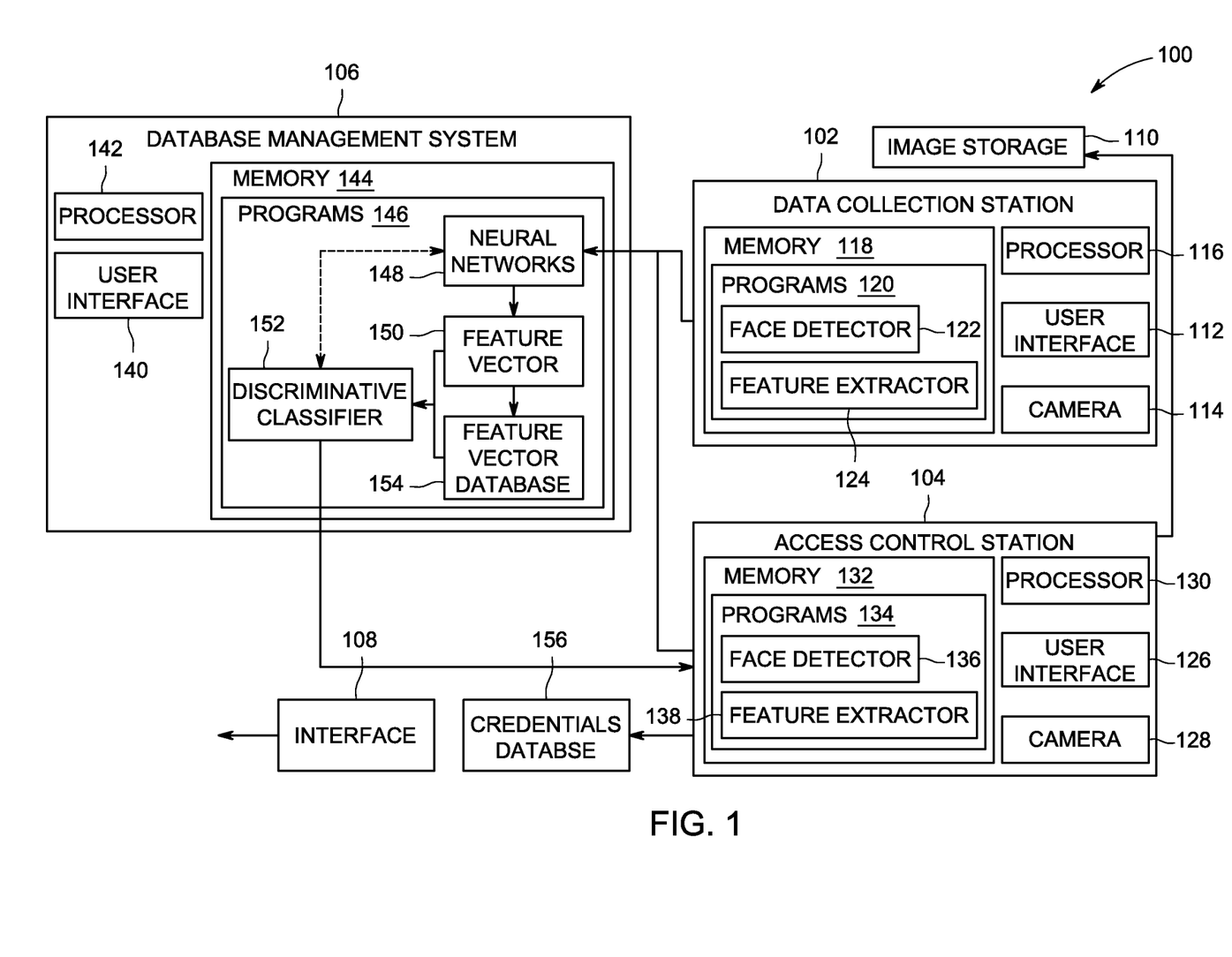
FIG. 1 shows an exemplary authentication system according to the disclosed embodiments.

FIG. 1 illustrates an exemplary authentication system 100 according to the disclosed embodiments. The authentication system 100 includes a data collection station 102, for collecting data for use in authentication, an access control station 104, for authorizing access to a system, facility, workstation, or other entity, and a database management system 106 for generating and storing information used for authentication. The authentication system 100 may also include an access interface 108 to other equipment that, upon authentication, grants the user access, and an image database or image storage facility. The access interface 108 may comprise equipment that may restrict access, including one or more locking doors, airlocks, gates, fences, alarms, or other suitable restrictive structures or access restrictive equipment. The authentication system 100 may further include a credentials database 156 for providing alternate access. The credentials database 156 may include one or more of single sign on information, user identification data, user photographs, or other information suitable for identifying a valid user.

For purposes of the present disclosure, granting access may include allowing the authenticated user to enter or use a facility, system, work area, workstation, or other entity, may include providing an authenticated user with information, instructions, materials, tools, or other items for accomplishing a task, or may generally include allowing the authenticated user to perform some function in a secured manner.

While the data collection station 102, access control station 104, database management system 106, access interface 108, and image storage facility 110 are shown in FIG. 1 as separate, interconnected sub-systems it should be understood that the authentication system 100 may also be implemented as a single system, or as a distributed system with the data collection station 102, access control station 104, database management system 106, access interface 108, and image storage facility 110 further segregated into various components or grouped together in different combinations. In addition, the authentication system 100 may be implemented at a single location, or the components may be distributed across different locations. For example, the data collection station 102, database management system 106, and image storage facility 110 may be located outside of a facility whose access is controlled by the authentication system 100, while the access control station 104 and access interface 108 may be located inside the facility.

The data collection station 102 may generally operate to enroll or add new users to the authentication system 100, or to add features extracted from additional user images to the system 100. The data collection station 102 may include a user interface 112, a camera 114, a processor 116, a non-transitory computer readable medium such as a memory 118, and one or more programs 120 stored on the computer readable medium. The user interface 112 may present information, including instructions related to image collection procedures and feedback, to a user and may allow a user to input information into the data collection station 102. The processor 116, under control of the one or more programs 120 may operate to control the operation of the data collection station 102 according to the disclosed embodiments. The processor 116 may control the camera 114 to acquire a user's image, and also control the processing of the user's image using a face detector 122 and a feature extractor 124 to provide features of the user's face, extracted from the user's image, to the database management system 106. While the face detector 122 and feature extractor 124 are illustrated as programs, it should be understood that they may be implemented in hardware, software, or a combination of hardware and software. Raw photographic images from the camera 114 may be stored in the image storage facility 110.

The face detector 122 operates on an image from the camera 114 to automatically detect a face in the image and produce a bounding box around the face. The face detector 122 may be a sliding window classifier, where a window of different scales is passed over the image, and at each location, a score is calculated as to the probability that the portion of the image in the window is part of a face. After sliding the window over the image, the scores are used to determine if and where there is a face in the image. Other techniques may also be used to detect a face in the image.

The detected face portion of the image is then passed to the feature extractor 124, where features of the detected face portion of the image are extracted. The disclosed embodiments advantageously utilize the extracted facial features as interim data for facial recognition at least because they provide a more compact facial representation using less data that the raw photographic images from the camera 114. Facial model fitting may be applied to the detected face portion to define key landmark points of the detected face portion for registration purposes. The key landmark points of the detected face portion can be used to warp the detected face portion into extracted facial features in a canonical form for use by neural networks of the database management system 106. The warping may include compensating for variations due to, for example, pose, lighting conditions, distance from the camera, facial expressions, hair style, or any other element or factor that does not directly correspond to a user's identity. The extracted facial features may then be passed to the database management system 106 for further processing for use in providing access.

The access control station 104 may also include a user interface 126, a camera 128, a processor 130, a non-transitory computer readable medium such as a memory 132, and one or more programs 134 stored on the computer readable medium. The user interface 126 of the access control station 104 may present information, including instructions as to gaining access, success or failure to gain access, to a user and may allow a user to input information into the data collection station 102. The processor 130, under control of the one or more programs may operate to control the operation of the access control station 104 according to the disclosed embodiments. The processor 130 may control the camera 126 to acquire the user's image, and control a face detector 134 and feature extractor 136 to provide features of the user's face, extracted from the user's image, to the database management system 106, in order to authenticate the user. In at least one embodiment, when a user appears in the camera's field of view, the camera 126 may automatically acquire the user's image, and feed the image to the face detector 134 for processing.

The face detector 134 and the feature extractor 136 operate to detect a face and provide a set of extracted features of the face to the database management system in the same manner as the face detector 120 and feature extractor 122 of the data collection station 102. Similarly, while the face detector 134 and feature extractor 136 are illustrated as programs, it should be understood that they may be implemented in hardware, software, or a combination of hardware and software. The database management system 106 processes the set of extracted facial features and provides a response to the access control station 104 which in turn may control the access interface 108 to grant or refuse access.

The database management system 106 may also include a user interface 140, a processor 142, a non-transitory computer readable medium such as a memory 144, and one or more programs 146 stored on the computer readable medium. The user interface 140 may present information, including information related to controlling operations of the database management system 106, including enrollment operations, authentication operations and training operations, and may allow a user to input information into the database management system 106. The processor 142, under control of the one or more programs 146 may operate to control the operations of the database management system 106 according to the disclosed embodiments. The programs 146 may include at least one neural network 148 that may operate on the extracted facial features from the data collection station and the extracted facial features from the access control station to produce feature vectors 150, representative of user's faces. The feature vectors 150 may be stored as sets of coded features in a feature vector database 154. The database management system 106 also includes a discriminative classifier 152 for determining whether different feature vectors meet a certain correlation threshold.

The neural network 148 generally operates as a powerful regression function that given features extracted from an image, regresses the extracted features to a set of features or a feature vector that captures characteristics of a user's face. Given two feature vectors, the database management system 106 can classify whether the feature vectors are from images of the same user or not. Thus, the comparison can be treated as a regression problem of feature vector pairs with a binary class output. The neural network 148 may include one or more Generative Adversarial Networks (GANs), Siamese neural networks, Convolutional Neural Networks (CNNs) or other suitable neural networks. The neural network 148 may be implemented as a single neural network or may be implemented as a combination of neural networks, assembled in series, in parallel, or in any suitable series parallel combination, and may be trained using features extracted from the raw photographic images stored in the image storage facility 110. During training, the neural network 148 presents feature vectors to the discriminative classifier 152 and uses a decision from the discriminative classifier 152 to determine whether the feature vectors match. When the neural network 148 has been trained to an acceptable level, the feature vectors 150 produced by the neural network 148 are stored in the feature vector database 154.

In some embodiments, a GAN may be used to model a user's facial appearance variations caused by external elements or factors, that is, elements or factors that are included in the feature vectors 150 but may be separate from facial characteristics identifying a user. By training a face image generator and a discriminator that can tell if a face is photorealistic or synthesized by a computer, the GAN face model may eventually train a face generative model that can encode face images into the feature vectors 150 as compact sets of codes, and from which new photo realistic face images can be generated when decoded. The GAN face model may be designed such that additional feature vectors may be generated that are augmented to include semantic variables that correspond to the external elements or factors. For example, some variables of the feature vectors 150 may correspond to facial wears, some may correspond to facial orientation as a result of a head pose, some may correspond to lighting conditions, or any other factor or element that may be separate from actual characteristics of a user's face. In addition, variables of one set of feature vectors may be incorporated into another set of feature vectors. For example, a GAN generated feature vector of a user's face without glasses may be subtracted from a GAN generated feature vector of the same user's face with glasses, and the subtraction residual may be added to the feature vector of a different user's face without glasses, to generate a photorealistic face of the different user with glasses. The augmented feature vectors may be stored with the existing feature vectors 150.

In other embodiments, augmented feature vectors may be produced with semantic variables that represent user worn equipment. For example, using the GAN face model, semantic variables may be used to synthesize additional new, augmented facial feature vectors for users that may include elements the user may be wearing near or on their face. Exemplary variables may include representations of different types of eye glasses, safety glasses, face shields, beard guards, hoods, or any other item that may be present near or on a user's face. This may be advantageous because the feature vectors 150 of a user's face may be synthesized and added to the database without requiring capturing a new image of the user. The new, augmented feature vectors may be used to train the GAN face model to further improve face detection and recognition performance.

In related operations, variables in existing feature vectors related to the external elements may be identified and, in some embodiments, one or more additional feature vectors may be generated without the variables to provide additional feature vectors for a variety of appearance variations for each user.

Additionally, the synthesized, augmented feature vectors may be used to ensure compliance with certain requirements. For example, one or more items may be required to be worn by a user in particular environments. The required items may be programmed in at the access control workstation, and feature vectors incorporating the one or more required items may be used to identify users. Users appearing without the required items may be refused access.

In some embodiments, a Siamese neural network may be adopted in combination with the GAN face model to produce the feature vectors 150 ultimately stored in the feature vector database 154. While training the Siamese neural network, image pairs from same user and from different users are sent to the Siamese neural network as inputs. The Siamese neural network operates to transform the input image pairs into feature vectors as codes, and the distances of the codes are compared. The Siamese neural network can be optimized during training by reducing the distances among the codes of the faces from the same users, in the feature vector space, and increasing the distances among the codes of the faces from different users. As a result, the trained Siamese neural network can transform unseen test face image pairs into codes for verification of whether they are from the same person or not by comparing their code distances.

Training the Siamese neural network jointly with the GAN face model may yield a Siamese deep neural network that has the GAN vector representation properties for face identification.

As mentioned above, when the neural network 148 has been trained to an acceptable level, the feature vectors 150 produced by the neural networks are stored in the feature vector database 154. The neural network 148 may be periodically re-trained, for example, when the system fails to identify a valid user. The user access control station 104 may acquire a user's image, and may fail to properly identify the user. The user may then present a proper set of credentials, or may be authenticated by another process or person, and an additional image acquired. The additional image may then be used to train the neural network 148 and to produce one or more additional feature vectors 150 in order to improve the performance of the face recognition system.

The discriminative classifier 138 may also be implemented as a neural network and may be a distance metric based discriminative classifier. The discriminative classifier 138 may also be trained using feature vectors until it is capable of identifying closely matching feature vectors, that is, feature vectors generated from features extracted from images of the same user. As mentioned above, the discriminative classifier 138 may be used during neural network training to provide decision feedback to the neural network 148. When the access control station 104 is in operation, the discriminative classifier 138 may operate to compare the acquired feature vector 150 to each of the feature vectors stored in the feature vector database 154 of the database management system 106, and authenticate a user if the acquired feature vector 150 matches a feature vector found in the feature vector database 154, and grant the user access as described above.

Figure 2:
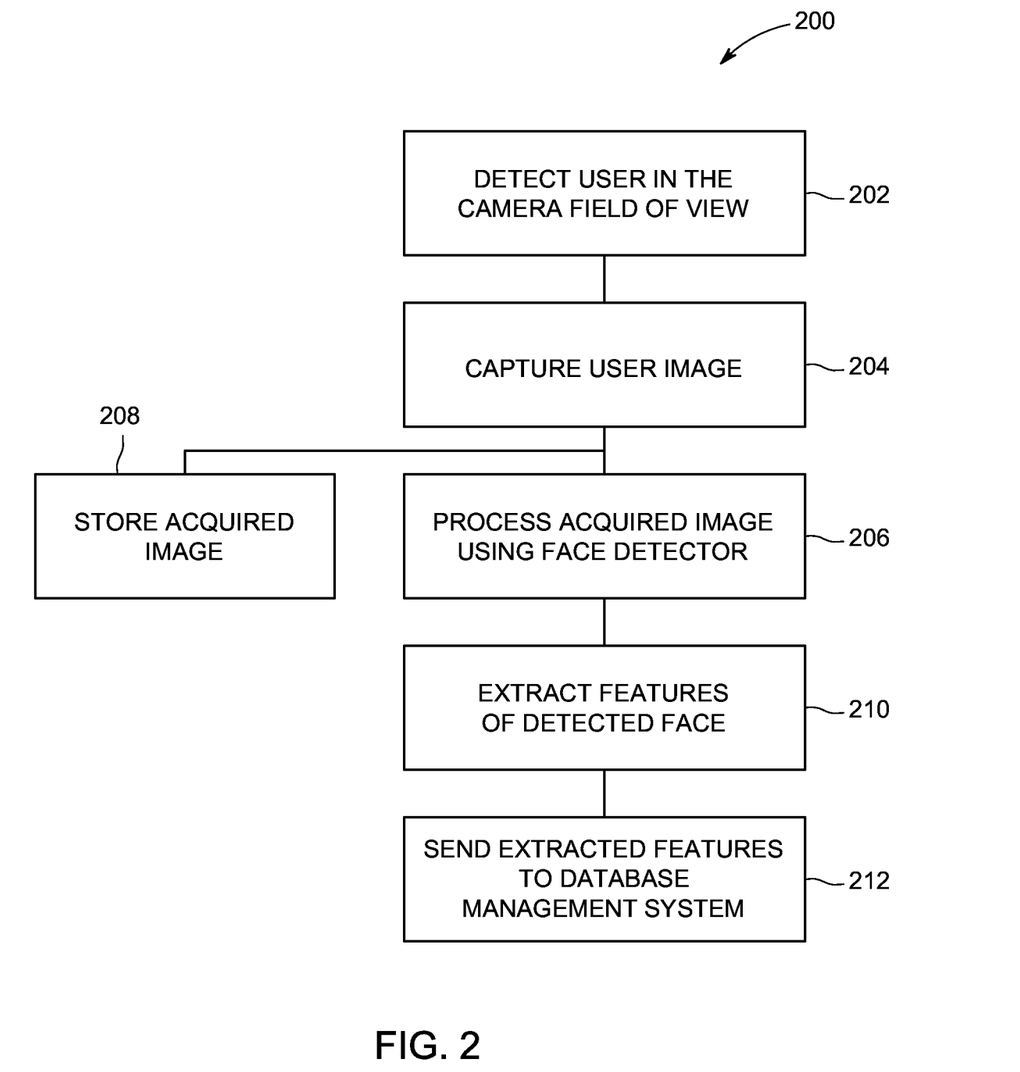
FIG. 2 shows a flow diagram illustrating the operations of a data collection station for acquiring new user facial feature vectors.

FIG. 2 shows a flow diagram 200 illustrating the operations of the access control station 104 in combination with the database management system 106. In block 302, a user enters the field of view of the camera 114 and in block 204, an image of the user is acquired. In some embodiments, the data collection station 102 may operate the camera 114 to acquire an image automatically or may acquire the image upon receiving an input from the user interface 112. In block 206, the data collection station 102 then operates to pass the image to the face detector 122 where a face in the acquired image is detected. The data collection stations 102 also operates to store the acquired image in block 208. In block 210, the data collection station 102 passes the detected face portion of the image to the feature extractor 124, and in block 212, the extracted facial features are passed to the database management system 106.

Figure 3:
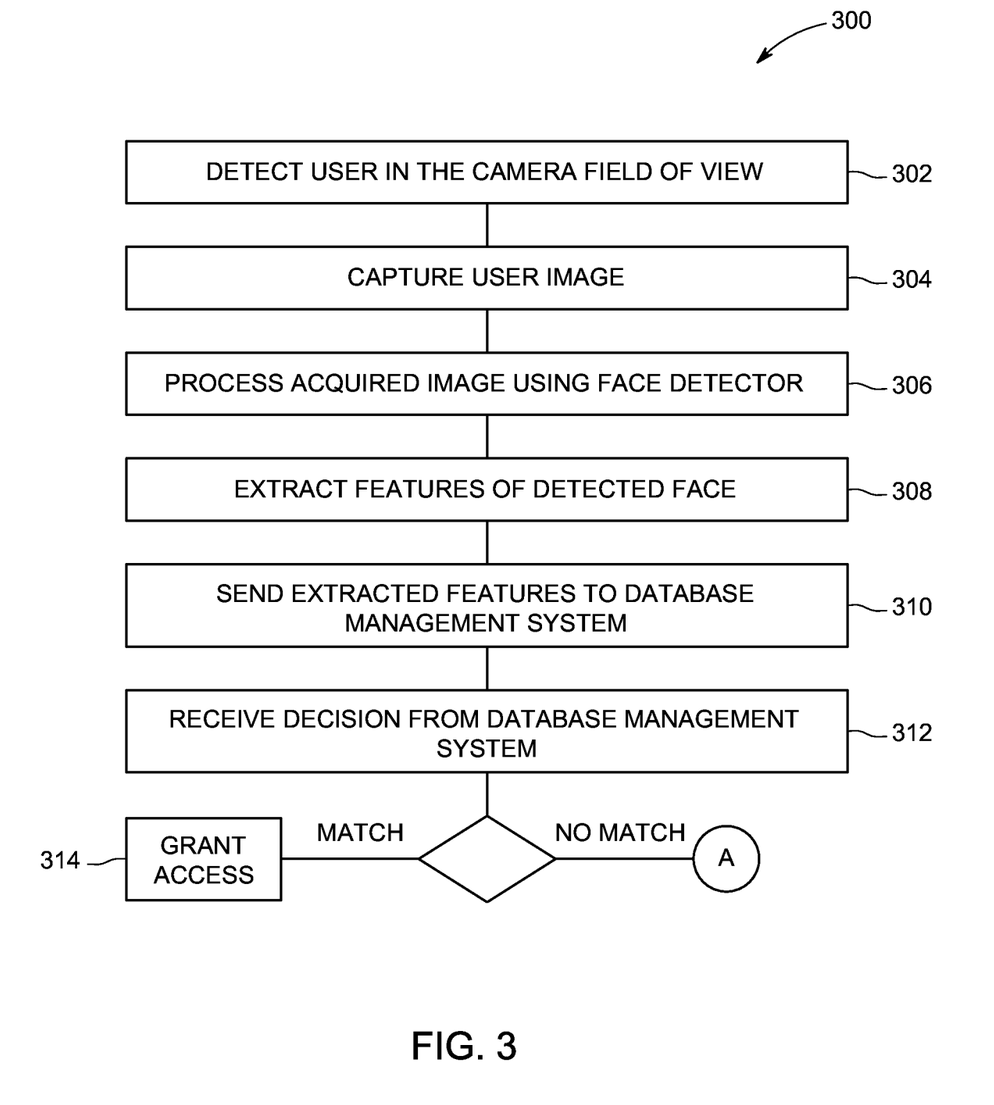
FIG. 3 shows a flow diagram illustrating the operations of an access control station for allowing a user access upon authentication.
Figure 4:
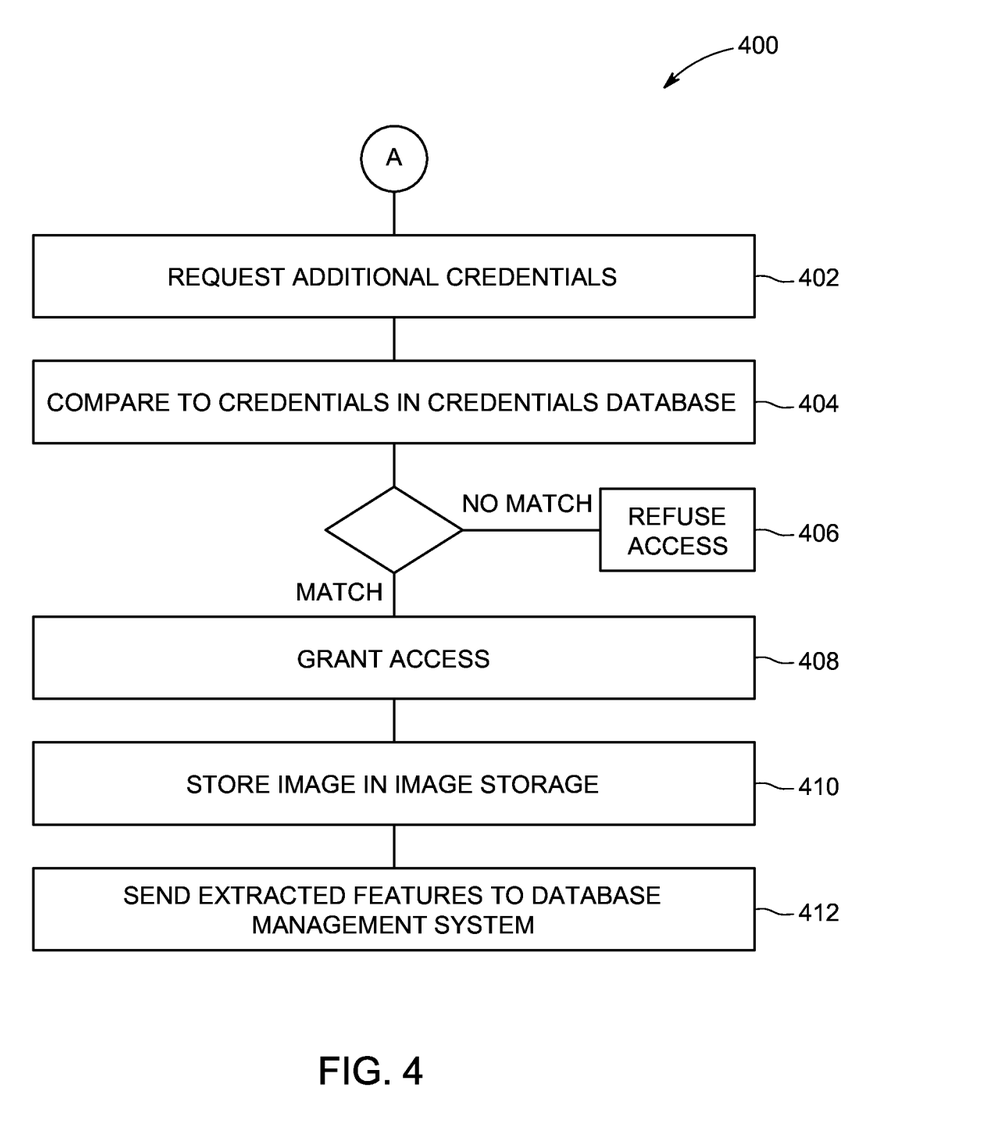
FIG. 4 shows a flow diagram illustrating alternate authentication procedures.

FIG. 3 shows a flow diagram 300 illustrating the operations of the data collection station 102 in combination with the database management system 106. In block 202, a user enters the field of view of the camera 128. The access control station 104 may generally operate the camera 128 to acquire an image automatically without additional user interaction, however, in some embodiments, input from the user interface may alternately initiate image acquisition. In block 304, the image of the user is acquired. In block 306, the access control station 104 operates to pass the image to the face detector 136 where a face in the acquired image is detected. The access control station 104 then passes the detected face portion of the image to the feature extractor 124 where facial features are extracted from the image as shown in block 308. In block 310, the extracted facial features are passed to the database management system 106, and in block 312, a decision is provided from the database management system as to whether the extracted features, after processing by the database management system 106 to produce a feature vector, match a feature vector in the feature vector database 154. As shown in block 314, if the feature vectors match, the use is granted access, otherwise additional steps 400 may be taken as shown in FIG. 4.

If the facial features extracted from the image acquired in block 304, after conversion to a feature vector, by the database management system 106, do not match a feature vector in the feature vector database 154, the access control system may request additional credentials, as shown in block 402, which may be compared to those in the credentials database 156, as shown in block 404. If no matching credentials are found in the credentials database 156, the user may be refused access as shown in block 406. In the event matching credentials are found in the credentials database 156 and are therefore valid, the user may be granted access as shown in block 408, and the image resulting in the non-matching feature vectors may be stored in the image storage facility 110, as shown in block 410. In addition, the features extracted from the non-matching image may be sent to the database management system 106 for processing by the neural network 148 to improve the neural network performance, as shown in block 412.

Figure 5:
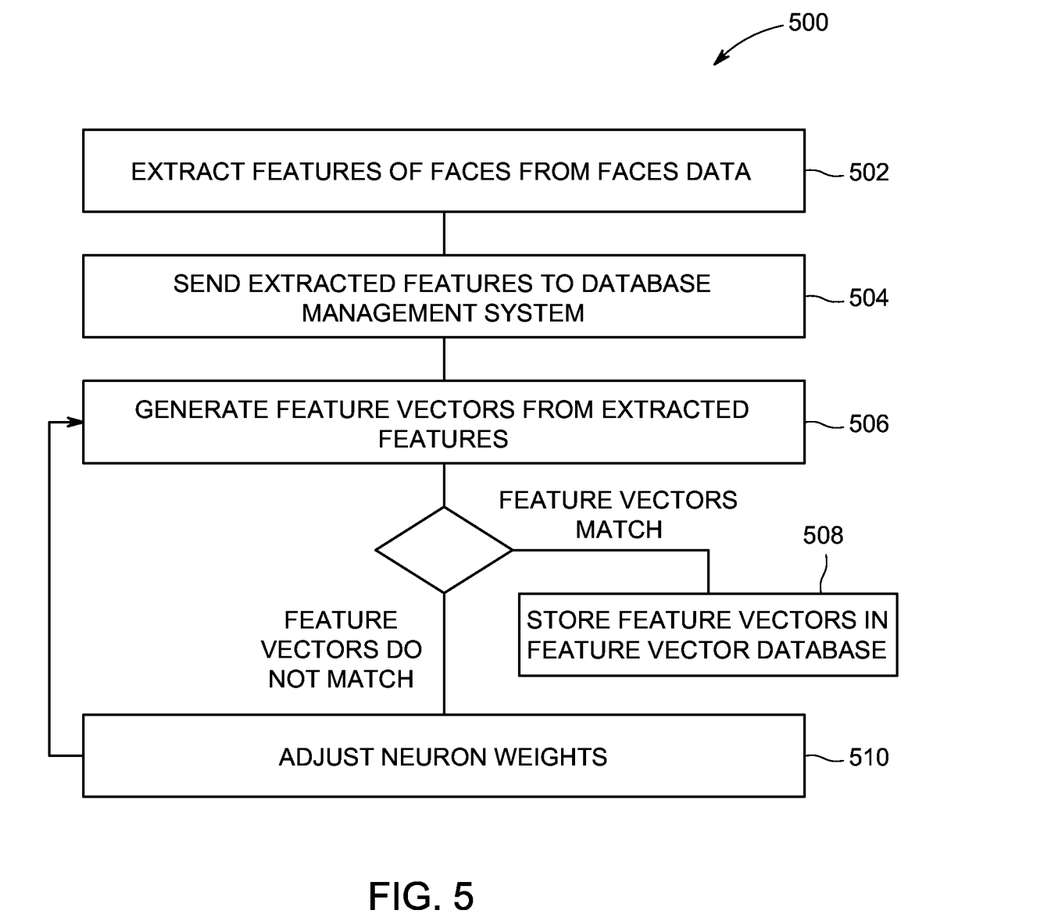
FIG. 5 shows a flow diagram illustrating learning procedures performed by the neural network and discriminative classifier of the database management system.

FIG. 5 shows a simplified flow diagram illustrating learning procedures 500 performed by the neural network 148 and discriminative classifier 152 of the database management system. The learning operations may be performed offline. In block 502 facial features are extracted from facial data, and in block 504, the extracted features are sent to the database management system 106 for processing. The facial data may originate from the image storage facility 110, the credentials database 156, or any other source of user facial data. In some embodiments, for training, the facial data is sent as pairs of features extracted from images of the same user. As shown in block 506, the one or more neural networks 148 generate feature vectors from the extracted facial features. In block 508, the discriminative classifier 152 determines if the feature vectors match, that is, whether the feature vectors meet a correlation threshold that ensures that the feature vectors represent the same user. If the feature vectors match, the feature vectors may be added to the feature vector database 154. If the feature vectors do not match, neuron weights of the neural network may be adjusted as shown in block 510 and a new set of feature vectors is generated by the one or more neural networks 148.

The disclosed embodiments provide an authentication system based on compact feature vectors generated from user images, that account for external elements, such as safety equipment worn by a user and changes in appearance. A neural network may be used to generate the feature vectors and may provide for augmentation of the feature vectors to model the external elements without having to acquire an image of a user showing the external elements. The neural network may be provided with updated images as user appearances change in order to improve performance.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

Various modifications and adaptations may become apparent to those skilled in the relevant arts in view of the foregoing description, when read in conjunction with the accompanying drawings. However, all such and similar modifications of the teachings of the disclosed embodiments will still fall within the scope of the disclosed embodiments.

Various features of the different embodiments described herein are interchangeable, one with the other. The various described features, as well as any known equivalents can be mixed and matched to construct additional embodiments and techniques in accordance with the principles of this disclosure.

Furthermore, some of the features of the exemplary embodiments could be used to advantage without the corresponding use of other features. As such, the foregoing description should be considered as merely illustrative of the principles of the disclosed embodiments and not in limitation thereof.

The invention claimed is:

1. An authentication system comprising:
one or more processors, a non-transitory computer readable medium, and one or more programs stored on the computer readable medium, wherein the one or more processors, under control of the programs implements:
at least one neural network trained to produce a first feature vector based on facial features extracted from a first facial image depicting a known person;
the at least one neural network configured to generate a set of augmented feature vectors associated with the known person, wherein each augmented feature vector in the set is based in part on the facial features extracted from the first facial image and also includes semantic variables corresponding to one or more external elements separate and distinct from the first facial image;
the at least one neural network, after training, configured to produce a candidate feature vector based on facial features extracted from a second facial image depicting a person to be identified; and
a discriminative classifier trained to compare the candidate feature vector to the first feature vector and the set of augmented feature vectors and to identify the person in the second facial image as the known person in the first facial image responsive to the candidate feature vector meeting a correlation threshold with the first feature vector or any of the augmented feature vectors in the set;
wherein the authentication system further comprises an access interface configured to allow the person in the second facial image access responsive to the correlation threshold being met.

2. The authentication system of claim 1, wherein the at least one neural network comprises a generative adversarial network.

3. The authentication system of claim 1, wherein the at least one neural network comprises a combination of at least one generative adversarial network and a Siamese neural network.

4. The authentication system of claim 1, wherein the discriminative classifier comprises a second neural network.

5. The authentication system of claim 1, wherein the at least one neural network is configured to utilize the set of augmented feature vectors to identify user worn equipment required for access.

6. The authentication system of claim 1, further comprising a data collection station including:
a camera for acquiring the first facial image;
a face detector for detecting a face of the known person in the first facial image; and
a feature extractor for producing the facial features extracted from the first facial image.

7. The authentication system of claim 1, further comprising:
an access control station including:
a camera for acquiring the second facial image;
a face detector for detecting a face of the person in the second facial image;
a feature extractor for producing the facial features extracted from the second facial image; and
a user interface for inputting additional credentials if the correlation threshold is not met;
the authentication system further comprising a credentials database with information for identifying a valid user for comparison to the additional credentials.

8. The authentication system of claim 1, wherein responsive to the candidate feature vector meeting the correlation threshold with a first augmented feature vector in the set of augmented feature vectors, then the one or more processors identify the person in the second facial image as the known person in the first facial image and determine that the one or more external elements associated with the semantic variables of the first augmented feature vector are present in the second facial image.

9. The authentication system of claim 1, wherein the semantic variables in a first augmented feature vector in the set correspond to at least one different external element than the semantic variables in a second augmented feature vector in the set.

10. The authentication system of claim 1, wherein the one or more external elements include user worn equipment.

11. The authentication system of claim 1, wherein the one or more external elements include one or more of glasses, face shields, goggles, beard guards or hoods.

12. An authentication method comprising:
training at least one neural network to produce a first feature vector based on facial features extracted from a first facial image depicting a known person;
using the at least one neural network to generate a set of augmented feature vectors with the known person, wherein each augmented feature vector in the set is based in part on the facial features extracted from the first facial image and also includes semantic variables corresponding to one or more external elements separate distinct from the first facial image;
using the at least one neural network to produce a candidate feature vector based on facial features extracted from a second facial image depicting a person to be identified;
training a discriminative classifier to compare the candidate feature vector to the first feature vector and the set of augmented feature vectors and to identify the person in the second facial image as the known person in the first facial image responsive to the candidate feature vector meeting a correlation threshold with the first feature vector or any of the augmented feature vectors in the set; and
allowing the person in the second facial image access responsive to the correlation threshold being met.

13. The authentication method of claim 12, wherein the at least one neural network comprises a generative adversarial network.

14. The authentication method of claim 12, wherein the at least one neural network comprises a combination of at least one generative adversarial network and a Siamese neural network.

15. The authentication method of claim 12, wherein the discriminative classifier comprises a second neural network.

16. The authentication method of claim 12, further comprising utilizing the set of augmented feature vectors to identify user worn equipment required for access.

17. The authentication method of claim 12, further comprising:
acquiring the first facial image using a camera;
detecting a face of the known person in the first facial image; and
using a feature extractor to produce the facial features extracted from the first facial image.

18. The authentication method of claim 12, further comprising:
acquiring the second facial image using a camera;
detecting a face of the person in the second facial image;
using a feature extractor to produce the facial features extracted from the second facial image;
inputting additional credentials if the correlation threshold is not met; and
allowing access if the additional credentials are valid.

19. The authentication method of claim 12, further comprising storing the first feature vector and the set of augmented feature vectors in a database, wherein the discriminative classifier accesses the database to compare the candidate feature vector to the first feature vector and the set of augmented feature vectors.

20. An authentication system comprising:
a database management system including one or more processors, a non-transitory computer readable medium, and one or more programs stored on the computer readable medium, wherein the one or more processors, under control of the programs implements:
at least one neural network trained to produce a first feature vector based on facial features extracted from a first facial image depicting a known person;
the at least one neural network configured to generate a set of augmented feature vectors associated with the known person, wherein each augmented feature vector in the set is based in part on the facial features extracted from the first facial image and also includes semantic variables corresponding to one or more external elements separate and distinct from the first facial image;
the at least one neural network, after training, configured to produce a candidate feature vector based on facial features extracted from a second facial image depicting a person to be identified; and
a discriminative classifier trained to compare the candidate feature vector to the first feature vector and the set of augmented feature vectors and to identify the person in the second facial image as the known person in the first facial image responsive to the candidate feature vector meeting a correlation threshold with the first feature vector or any of the augmented feature vectors in the set; and
an access control station including:
a camera for acquiring the second facial image;
a face detector for detecting a face of the person in the second facial image;
a feature extractor for producing the facial features extracted from the second facial image; and
an access interface, controlled by the access control station for providing the person in the second facial image access to equipment responsive to the correlation threshold being met.

* * * * *